United States Patent [19]

Diaz

[11] 4,135,587
[45] Jan. 23, 1979

[54] CASES FOR ENCLOSING SUBSTRATES

[75] Inventor: Stephen H. Diaz, Los Altos, Calif.

[73] Assignee: Raychem Corporation, Menlo Park, Calif.

[21] Appl. No.: 786,835

[22] Filed: Apr. 12, 1977

Related U.S. Application Data

[63] Continuation-in-part of Ser. No. 638,687, Dec. 8, 1975, abandoned.

[51] Int. Cl.² .................................. H02G 15/18
[52] U.S. Cl. ............................. 174/92; 156/49; 174/DIG. 8
[58] Field of Search ............... 174/21 R, 22 R, 77 R, 174/84 R, 88 R, 91, 92, 93, 138 F, DIG. 8; 156/49

[56] References Cited

U.S. PATENT DOCUMENTS 3,576,937  5/1971  Eldridge, Jr. .................. 174/92
3,663,740  5/1972  Dellett .......................... 174/92

FOREIGN PATENT DOCUMENTS

2158992  5/1973  Fed. Rep. of Germany ............ 174/92

Primary Examiner—Laramie E. Askin
Attorney, Agent, or Firm—Lyon & Lyon

[57] ABSTRACT

The invention relates to a novel case for enclosing a short length of at least one elongate substrate, especially a cable splice. The case has a wrap-around body section and end sections comprising deformable sealing members which in use are deformed into a configuration in which an increase in pressure within the case increases the forces maintaining the sealing members in contact with the substrate. Preferably the case includes heating means which is used to heat the sealing members and to activate a hot melt adhesive placed thereon. The cases are particularly useful for encapsulating splices in pressurized telephone cables.

42 Claims, 12 Drawing Figures

FIG_1

FIG_2

FIG_3

FIG_4

FIG_5

FIG_6

FIG_7

FIG_8

FIG_9

FIG_10

FIG_11

FIG_12

CASES FOR ENCLOSING SUBSTRATES

CROSS-REFERENCE TO RELATED APPLICATION

This application is a continuation-in-part of my co-pending application Ser. No. 638,687 filed Dec. 8, 1975 (now abandoned).

This application is related to, and incorporates by reference, the said application Ser. No. 638,687 (now abandoned) and in addition applications Ser. Nos. 601,344, filed Aug. 4, 1975 (now U.S. Pat. No. 4,085,286); 601,549, filed Aug. 4, 1975 (abandoned in favor of continuation application Ser. No. 735,958 filed Oct. 27, 1976 which in turn has been abandoned in favor of continuation application Ser. No. 818,711 filed July 25, 1977); 601,638 filed Aug. 4, 1975; 601,639 filed Aug. 4, 1975; and my application Ser. No. 638,440 filed Dec. 8, 1975 (now abandoned in favor of continuation-in-part application, Ser. No. 775,882 filed Mar. 9, 1977).

BACKGROUND OF THE INVENTION

1. Field of the Invention

This invention relates to improved hollow cases for enclosing substrates, especially cable splices.

The cases of the invention are particularly useful for enclosing splices between multi-pair telephone cables, and will be described chiefly by reference to such use. It is to be understood, however, that the invention is not limited to such use.

2. Description of the Prior Art

The function of a splice case is to provide environmental protection for the splice. For this purpose it must remain sealed around the cables in spite of variations in the difference in gaseous pressure between the inside and outside of the case, which can be substantial. In non-pressurized cable systems, such variations will cause the internal pressure sometimes to be less and sometimes to be more than the external pressure. Even in pressurized cable systems, in which positive gaseous pressure is normally maintained within the cable, the external pressure can sometimes exceed the internal pressure. The known splice cases all suffer from one or more serious disadvantages, and the present invention provides a novel splice case which alleviates or removes one or more of those disadvantages.

Thus the two methods at present most widely used to encase splices in pressurized telephone cable systems employ soldered lead sleeves (whose installation requires a great deal of skill and time) or cases which are bolted together and sealed with mastic (whose installation requires the careful assembly of many pieces, taking care to ensure that the bolts are properly torqued and that the correct amount of mastic is employed). Particular types of splice case are described in German Pat. Nos. 1,908,996 and 1,966,933, U.S. Pat. Nos. 3,678,174, 3,663,740 and 3,576,937; and German OLS No. 2,158,992.

SUMMARY OF THE INVENTION

In its broadest aspect the invention provides a case for enclosing a short length of at least one elongate substrate in a sealed hollow enclosure, the case having end portions comprising deformable sealing members for sealing around the substrate and a centre portion for forming a said hollow enclosure, which case comprises:

(a) at least one wrap-around body section (as hereinafter defined) which can be placed in an assembled position in which the contiguous surfaces thereof can be joined to each other along at least one junction which extends longitudinally of the case;

(b) a plurality of end sections, each of which
   (i) is formed integrally with a body section or can be placed contiguously with one or more body sections in an assembled position in which it can be sealed thereto; and
   (ii) comprises a transversely-extending deformable sealing member adapted to be deformed into a configuration in which there is a seal between the sealing member and a substrate and in which an increase in the pressure within the hollow space increases the forces maintaining the sealing member in contact with the substrate, the surface of the sealing member which contacts the substrate being composed of a material which is flowable at a temperature at which the member is deformable; and (c) assembly means for maintaining the body sections and end sections in the assembled position, e.g. an adhesive or a mechanical closure means or both.

In order that the sealing member, when deformed, can form a seal with the cable jacket (which in practice will always have scratches or other imperfections in its surface) it is essential that the interface of the cable and the sealing member should comprise, at the time of sealing, a material which will flow into such imperfections. Thus it is not possible to obtain a satisfactory direct seal at room temperature between a cable and a sealing member when the seal has been formed solely by elastic deformation of the sealing member at room temperature. Such flowable material may be provided by the sealing member itself when it is a material which is relatively non-elastic at room temperature but becomes deformable at an elevated temperature. Alternatively or additionally, a separate flowable composition may be applied to the contacting surfaces of the sealing member and/or the cable; the composition may be flowable at room temperature (e.g. a grease or a mastic) or at an elevated temperature. Preferably such flowable composition is (or, after it has flowed, becomes) an adhesive, hot melt adhesives being especially preferred. If the flowable material does not function as an adhesive to bond the sealing member sufficiently to the cable, then there is a danger, especially when the seal is one which has been formed by elastic deformation of the sealing member at room temperature, that if the pressure outside the case exceeds the pressure inside the case, the seal will lift and thus allow moisture to enter the case. Under these circumstances, the end section should also comprise, preferably exterior to the first sealing member, a second transversely-extending deformable sealing member adapted to be deformed into a configuration in which there is a seal between the sealing member and a substrate and in which an increase in the pressure outside the case increases the forces maintaining the second sealing member in contact with the substrate. The invention includes, of course, all cases in which the end sections comprise such second deformable sealing members, although they are not normally required when the first sealing member is adequately bonded to the cable. The description herein of the first sealing member is generally applicable to the second sealing member, if present, except of course that its deformed configuration is in the opposite direction.

The term "wrap-around body section" is used herein to denote a section which has an open cross-section and can be placed around a substrate which does not have a free end. When a single body section is used, it must be sufficiently flexible to be deformed around the substrate to provide a closed cross-section in the assembled position (this is sometimes known as a "clam-shell" member). When two or more body sections are used, they must cooperate together in the assembled position to provide a centre portion having a closed cross-section. One important reason for having a wrap-around body portion is that even when the substrate has a free end, as for example when two new cables are being spliced, it is always inconvenient (and often impossible) for a body portion of tubular cross-section to be pushed up the substrate so that it is out of the way while the splice is being made (or subsequently repaired).

Preferably the end-sections are also of the wrap-around type, so that the splice case can be applied around a substrate which has no free end. However, this is not essential, when the substrate does have a free end, because the end sections do not seriously interfere with the making or subsequent repair of the splice. For example, the invention includes a case which comprises two wrap-around body sections and two end sections, each of which comprises a said sealing member having an aperture of closed cross-section therein for receiving a substrate. However, when the end section is not of the wrap-around type, I have found that as a practical matter it is highly advantageous that the sealing member should be heat-recoverable.

In a preferred embodiment the case comprises at least two mating case sections, preferably two mating case sections of generally hemi-cylindrical shape, each of which case sections comprises a hollow body section and two end sections formed integrally therewith, the sealing members of the opposed end sections being adapted to form between them an aperture of closed cross-section for receiving a substrate. Preferably each of the mating case sections comprises a peripheral sealing sheet which comprises a said transversely-extending sealing member at each end thereof, and which contacts the other peripheral sealing sheet in the assembled position and is adapted to form therewith a continuous internal seal around the junctions between the two case sections and a substrate enclosed between them. To ensure a satisfactory seal between the sealing sheets, it is preferred that at least one of the sealing sheets carries, on the surface thereof which contacts the other sealing sheet, a coating of a material which softens on heating and/or is an adhesive, preferably a hot-melt adhesive. In order for the two mating case sections to form a sealed hollow enclosure it is very desirable for the entire periphery of each of the sealing sheets to be hermetically sealed to the case section which comprises it, for example with the aid of an adhesive, or to become so sealed thereto during formation of the splice. Measures which can be used to assist in achieving a satisfactory seal include the provision in each case section of a ledge running around at least a part of the internal periphery of the case section and adapted to support the peripheral sealing sheet; and the provision in each case section of a channel running around at least a part of the internal periphery of the section, coupled with the use of a peripheral sealing sheet having an edge flange adapted to fit into the channel.

In a modification of this embodiment of the invention, the end sections are not integral with the body sections, so that the case comprises two body sections and two pairs of end sections, the sealing members of each pair being adapted to form between them an aperture of closed cross-section for receiving a substrate.

It is to be understood that although the use of a sealing sheet has been described above in connection with the preferred embodiment of the invention, like measures can be used with any case according to the invention to assist in the formation of satisfactory seals at one or more of the junctions between end sections, between body sections, and between end and body sections.

In designing and assembling a splice case, the most critical seal is between the case and the substrate, since the precise dimensions and nature of the substrate cannot be predicted in advance. The integrity of this seal is particularly important when the splice case is being applied to a pressurised cable. It is an important feature of this invention that the sealing members deform to a configuration in which an increase in the pressure within the hollow space increases the forces maintaining the sealing member in contact with the substrate. I have found that such an "inside-out" configuration is essential for pressurised cables in order to maintain the desired internal gaseous pressure, and that it also provides other advantages with all types of substrate. Thus a configuration of this kind can only be obtained by having sealing members which are directed toward the middle of the case, and are thus protected from physical damage by the case. A further important advantage is that when the sealing members are deformable at an elevated temperature and/or are coated with a material which softens on heating and thus assist in making a satisfactory seal (as is preferred and as described in detail below), the remainder of the case provides thermal insulation and reduces the amount of heat which must be supplied to the sealing member to render it deformable and/or to melt the said material.

To assist in making a satisfactory seal between the sealing members and the substrate, it is preferred that each sealing member should carry, on the surface thereof which contacts the substrate, a coating of a material which is an adhesive and/or which softens on heating, preferably a hot-melt adhesive.

The sealing members must be capable of deforming around the substrate, and in some circumstances a sealing member which is resiliently deformable at room temperature may give satisfactory results. However, I prefer that each sealing member should be deformable at an elevated temperature; the temperature should, of course, be one which does not damage the substrate or the rest of the case. I have obtained excellent results with members which are relatively rigid at room temperature but become resiliently deformable when heated, and are deformed by being pressed around the substrate; at least part of the member may be corrugated to assist in the deformation. Such members can be made of cross-linked thermoplastic polymers which are capable of being rendered heat recoverable. They should preferably be pre-stretched by at least 12%, preferably 12 to 25%, e.g. about 12%, to ensure that they grip tightly about the substrate. Alternatively the sealing member can be heat-recoverable.

The preferred embodiments of the invention require the use of heat to seal the sealing members to the substrate and to seal the body and end sections to each other. The necessary heat can be supplied from an external source, e.g. a hot-air gun, but it is often difficult to obtain satisfactory results in this way; thus the "inside-out" configuration makes it difficult to supply the heat to the sealing members unless the end sections are sealed to the substrate before, and while separate from, the body sections. It is therefore preferred that the case should comprise heating means which will heat the sealing members to a temperature at which they are deformable and/or will heat a material applied to one of the contacting surfaces to a temperature at which it will melt or otherwise assist in forming a seal between the surfaces. I have obtained excellent results using a heating means which comprises a layer of a conductive polymer and electrodes for connection to an external source of power (e.g. DC from a 12 or 24 volt battery or AC from 120 volt source) to pass electric current through the layer; the electrodes preferably being in the form of layers either side of the conductive polymer layer; and the conductive polymer layer preferably exhibiting PTC behavior, i.e. a rapid increase in resistivity at a particular temperature or over a particular temperature range, and optionally being sandwiched between two constant wattage layers of a conductive polymer. Heaters of this kind are particularly useful if they have a plurality of apertures therein which facilitate deformation; however, it should be noted that it is preferable that the perforations should be covered by a backing sheet to ensure that other parts of the splice case (e.g. the shape-controlling means described hereinafter) do not get caught therein. The backing sheet can also serve to minimise distortion of the heater by placing it on the neutral bending axis of the deformable member. For details of electrical heaters comprising conductive polymers, reference should be made to my application Ser. No. 638,440 filed Dec. 8, 1975 abandoned in favor of the continuation-in-part thereof filed Mar. 9, 1977 having Ser. No. 775,882 and the other pending applications and publications referred to therein. In this way it is possible to ensure that the heat is generated exactly where it is needed and in the quantities needed, and thus reduce the overall amount of heat generated and the danger of overheating.

It is highly desirable that a particular design of splice case should be satisfactory for use with cables having substantially different diameters. In addition it is sometimes desirable that two cables should enter each end of the case; or that one cable should enter one end and two cables should enter the other; or that an additional cable should be brought into an existing splice case. The splice cases of the invention preferably comprise means for controlling the shape of the deformable sealing members as they deform. Such means may be designed to urge the sealing members into conformance with a substrate, for example at least one, preferably two, adjustable guide means associated with each deformable sealing member, thus making the case more versatile with respect to the substrates about which it can seal. Alternatively or additionally the means may be designed to control the shape of the sealing member in the transition between the substrate and the relatively rigid non-deformable part of the end section.

Another highly desirable feature of a splice case is that it should be re-openable and re-sealable, so that work can be carried out on the enclosed splice. It is sometimes possible to achieve this feature by the presence of a re-openable and resealable trap door in one or both of the body sections, but this gives only limited access to the cable. It is therefore preferred that the assembly means (c) should be one which can be released to allow the case sections to be separated and removed, for example a hot-melt adhesive and/or an adjustable strap or the like surrounding the case, or a plurality of locking members which slidably engage with locking surfaces on the exterior surface of the end or body sections adjacent to junctions between them. These measures make it possible to reopen the case by removing any mechanical closure means and heating the hot melt adhesive until the body sections (and end-sections if integral therewith) can be separated. To reseal the case, the body sections are put together again with a fresh layer of hot-melt adhesive, e.g. a new peripheral sealing sheet, between them, and heated until the seal is reformed.

In describing the case of the invention, the adhesives which are preferably used at the contacting surfaces have been described as hot melt adhesives, which are preferred. It is to be understood, however, that any suitable type of adhesives, e.g. thermosetting, thermoplastic or solvent-activated adhesives, can be used.

BRIEF DESCRIPTION OF THE DRAWINGS

The invention is illustrated in the accompanying drawings, in which.

DETAILED DESCRIPTION OF THE INVENTION ILLUSTRATED IN THE DRAWINGS

Figure 1:
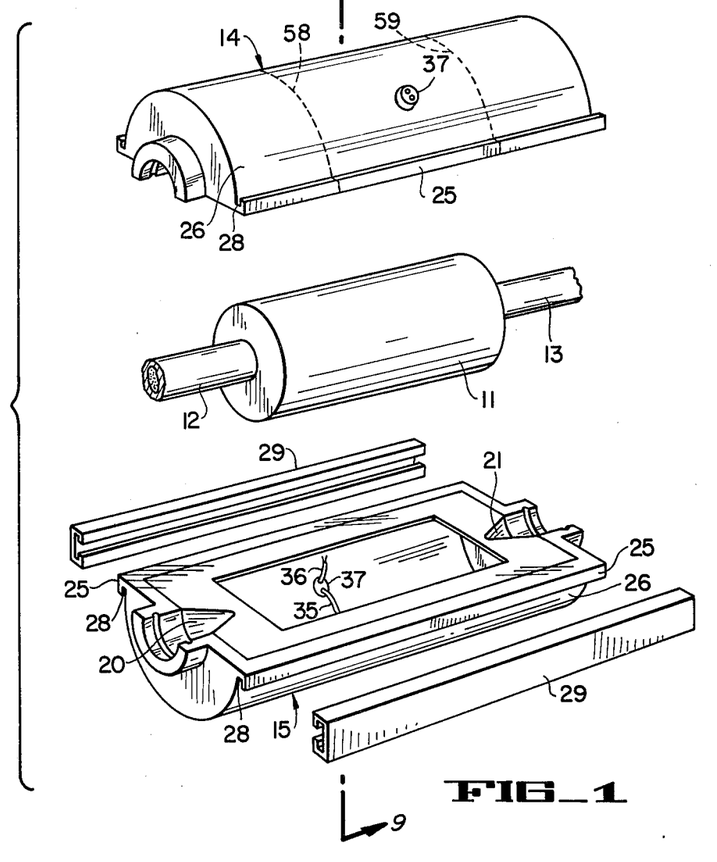
FIG. 1 is a perspective exploded view of a splice case according to the present invention and a cable splice.

Referring now to FIG. 1, lengths of telephone cable 12 and 13 are joined at splice 11. A pair of substantially identical hemicylindrical case sections 14 and 15 can be mated together to define a generally cylindrical hollow space for encapsulating splice 11, with an opening at each end to receive cables 12 and 13.

The splice case may have other configurations than cylindrical although cases having a generally round cross-section are desirable when they are ultimately pressurized. Elongated cases generally circular or oval in cross-section are preferred for economy of space. The case sections need not be substantially identical in shape. Likewise there may be two or more openings at each end or more openings at one end than at the other. These details are dictated by the number of cables being spliced and the manner in which they are spliced.

Figure 2:
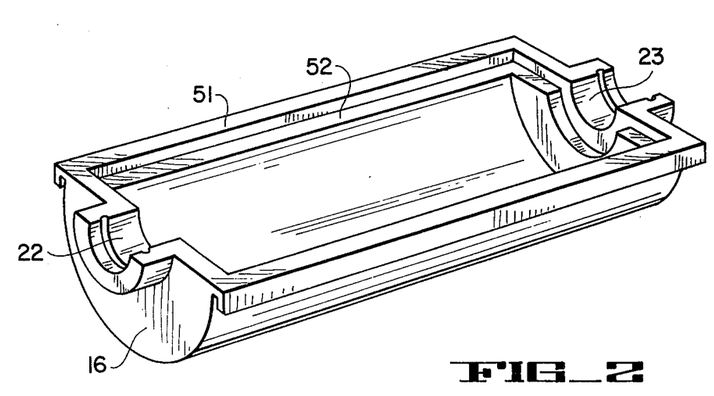
FIG. 2 is a perspective view of a case section of the splice case of FIG. 1.
Figure 3:
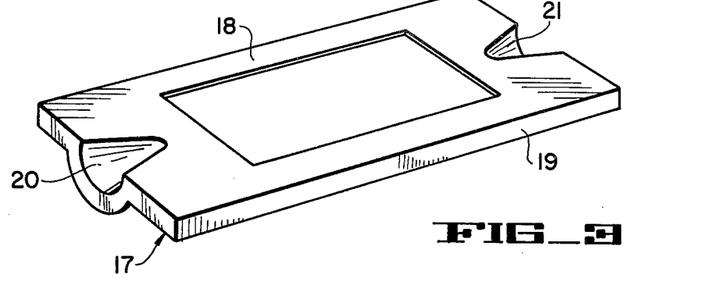
FIG. 3 is a perspective view of a sealing sheet on one half of the splice case of FIG. 1.

Referring now to FIGS. 2 and 3, each case section comprises a rigid shell member 16 and a sealing sheet 17, which is shown as a monolithic structure but can be laminar structure. Preferably it comprises a layer of a polymer composition having a layer of adhesive (not shown) disposed thereon, which, when activated, bonds the shell members together and forms a seal between the resilient layer and the cables entering the splice case. The adhesive is preferably a hot-melt adhesive, preferably one that becomes tacky above its melting point without significant flow, e.g. as described in U.S. application Ser. No. 492,722 filed July 29, 1974 (now U.S. Pat. No. 4,018,733).

Sealing sheet 17 can be fabricated from a variety of polymer compositions. Among suitable polymers will be elastomers which will both accommodate and recover from a deformation, preferably having an ultimate elongation of up to about 200% at the temperature at which the adhesive is activated. Alternatively sheet 17 can be a polymer which can be rendered heat-recoverable, e.g. a crosslinked crystalline polymer. Heat-recoverable polymeric articles are well known in the art and are described for example in U.S. Pat. No. 3,086,242. A suitable polymeric composition is, for example, a mixture of 88% ethylene-ethyl acrylate copolymer, 9% pigment, and 3% finely divided silica (percentages in this specification are by weight).

Figure 4:
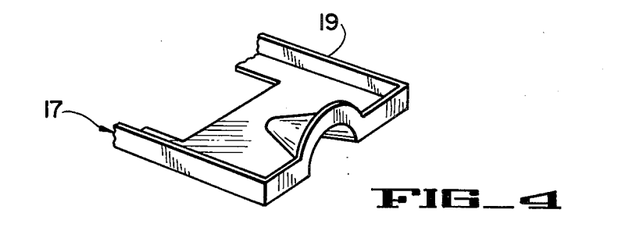
FIG. 4 is a partial perspective view of the reverse side of the sealing sheet of FIG. 3.

FIG. 3 illustrates the configuration of sealing member 17 prior to its being affixed to shell member 16. FIG. 4 illustrates the reverse side of that shown in FIG. 3. As can be seen from FIGS. 3 and 4, sealing member 17 is configured to conform to the peripheral edge of shell member 16 and forms a mating surface 18. Mating surface 18 is so denominated because, in a closed splice case, it contacts its opposite number in another case section to form the bond between the halves. As shown, sealing member 17 is provided with a peripheral flange 19 about its perimeter to aid in affixing it to shell member 16.

Sealing member 17 is also provided with semi-conically contoured portions 20 and 21 at either end in order that flange 19 can be affixed to shell member 16 at its semi-circular end openings 22 and 23. These end openings define the opening to the splice case for the cables being spliced (see FIGS. 1 and 2).

A case section as shown in FIG. 1a is preferably an integral structure. However, the case may be made with separate end sections as indicated by dashed lines 58 and 59. The end sections may be joined to the body section by any suitable means. For example, sealing means between end and body sections like the sealing sheet joining the case halves may be employed.

Figure 5:
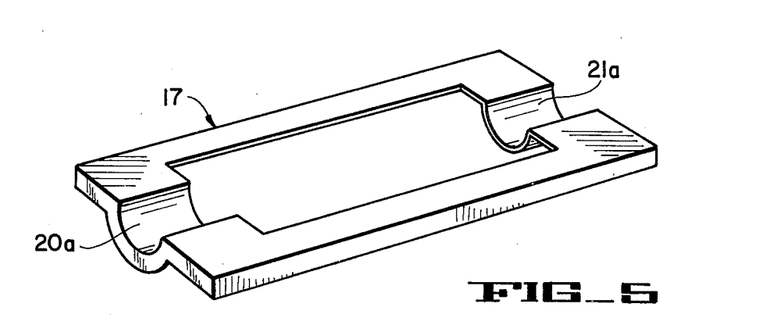
FIG. 5 is a perspective view of the sealing sheet of FIG. 3 after it has been rendered heat recoverable.

As previously indicated, sealing member 17 may be deformed about the substrate by pressing the substrate against resilient semi-conical portions 20 and 21 at the time the splice case is being installed, and this is generally preferred. Alternatively the semi-conical portions 20 and 21 can be expanded to a suitable heat-recoverable form before installation and then recovered around the substrate (i.e. deformed around the substrate) by heating at the time of installation. A suitable configuration of sealing member 17 in its heat recoverable form is shown in FIG. 5 wherein it can be seen that the member has been deformed in the area of the semi-conical portions 20 and 21 to form half cylinders 20a and 21a. The diameter of the cylinders formed by these half cylinders when the case halves are mated will exceed the maximum outside diameter of the largest cable being employed to make the splice. The expansion of the sealing member to the form shown in FIG. 5 is generally accomplished after it is affixed to the shell member. The expansion can be done by heating the member to a temperature above the crystalline melting point of the polymer composition forming the resilient layer and deforming it to the configuration shown, for example by a mandrel.

Referring now to FIG. 2, shell member 16 is provided with a ledge 51 having recessed portion 52 which supports the sealing member and is of varying depth so that the sealing member clears the upper surface of the ledge by a small and constant amount which is sufficient to allow good contact with its opposite number. Accordingly, the depth of the depressed position will vary according to the thickness of the sealing member.

To facilitate positive contact of the sealing members, a layer of a compressible material, for example, a foamed polymer, may be inserted beneath the sealing member and the surface of the recessed portion 52. When this is done, the sealing member can clear the upper surface of the ledge by a larger amount than would otherwise be possible. When the case halves are finally mated, the foamed layer will be compressed. Its resistance to compression will act to positively engage the opposing sealing members.

Sealing member 17 may be affixed to the recessed portion 52 by use of an adhesive. Thermoplastic adhesives of sufficiently high softening point can be used. However, it is presently preferred to employ thermosetting adhesives for this purpose. The well known epoxy resins are an example of a suitable type.

The shell member is provided with means for holding the case halves together in their mating relationship prior to activating the adhesive layer, and to carry the hoop loads during pressurized service. Such means can also function to strengthen the splice case and serve to properly position the halves during their joinder.

Figure 9:
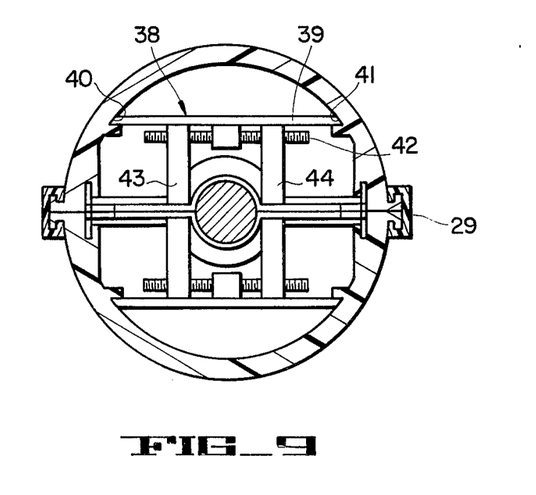
FIG. 9 is a cross-section view through the assembled splice case of FIG. 1 along line 9—9.

One such means is illustrated in FIGS. 1, 2 and 9 which show shell member 16 being provided with a rim 25 adjacent ledge 51 along a line parallel to the long axis of the shell member. Rim 25 with outer wall 26 of the shell member defines a peripheral channel 28. When two case halves are mated together as shown in FIG. 9, they are initially held together in the desired relationship by inserting a generally "C" shaped bar 29 as a locking member into the channels. Other suitable fastening means can be employed such as latch, hinge and pin closures.

Figure 6:
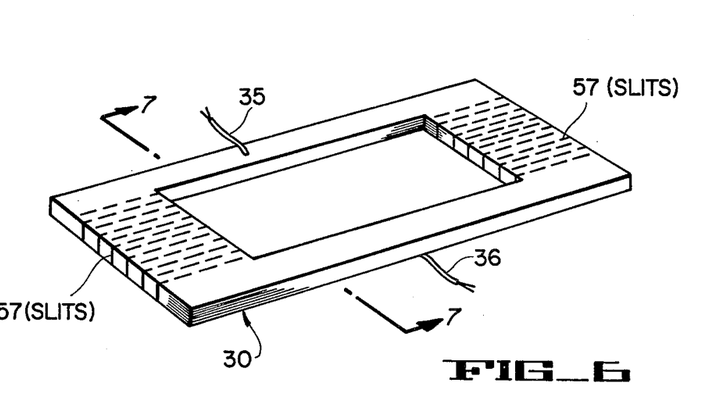
FIG. 6 is a perspective view of a heater that can be used in conjunction with the sealing sheet of FIG. 3.
Figure 7:
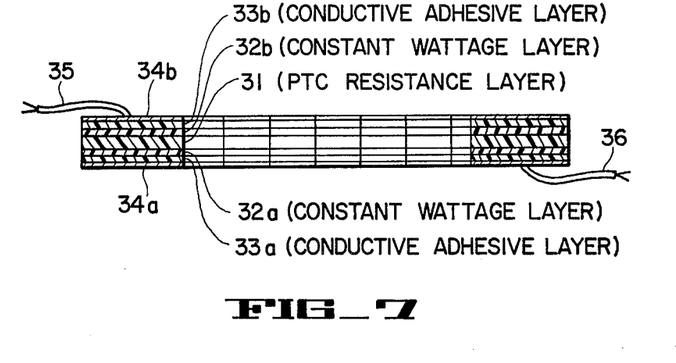
FIG. 7 is a cross-section of the heater of FIG. 6 taken along line 7—7.

In a particularly preferred embodiment of the present invention, sealing member 17 further comprises an expandable electrical heating element bonded to the resilient layer. The preferred construction for this element is described in detail in my application Ser. No. 638,440 filed Dec. 8, 1975 (now abandoned) and the continuation-in-part thereof referred to previously having Ser. No. 775,882 filed Mar. 9, 1977. A heater 30 construction in accordance with the aforementioned application is shown in FIGS. 6 and 7. FIG. 6 illustrates the overall appearance of the heater prior to its being bonded to the underside of sealing member 17 as shown in FIGS. 3 and 4. Preferably, the heater is one that is self regulating as to its maximum temperature.

The detailed construction of heater 30 is best seen in FIG. 7, a cross-section view of the heater of FIG. 6. As can be seen from FIG. 7, the heater comprises a plurality of layers. Core layer 31 is a polymeric PTC layer, i.e., it is fabricated from a layer of conductive polymer that exhibits a positive temperature coefficient (PTC) of resistance. Such materials are well known to those skilled in the art and have previously been used in self-regulating heaters.

The distinguishing feature of such polymers is that, upon attaining a certain temperature, a substantial increase in resistance occurs, an increase that for many compositions effectively precludes them from drawing any significant current. Heaters known to the prior art utilizing PTC materials generally exhibit, therefore, a relatively small increase in resistance with increasing temperature as heating is initiated. However, at some elevated temperature, the resistance begins to increase rapidly with further temperature increase. The temperature (which may be a temperature range) at which the rapid increase in resistance begins is often designated the switching or anomaly temperature ($T_s$). Above $T_s$, resistance can rise rapidly to a level that the current through the PTC layer is, in effect, switched off. Therefore, in actual use the $T_s$ represents about the maximum temperature to which the heater element will rise. Therefore, by using PTC compositions a degree of temperature regulation can be achieved without the use of thermostats, fuses or inline resistors. Accordingly, the PTC material employed in layer 31 should be selected having a $T_s$ at about the desired maximum temperature desired.

A wide variety of PTC compositions are known and, in general, comprise a crystalline polymer having, as a filler, a particulate conductive material such as a metal powder or conductive carbon black dispersed therein. The most useful types of PTC materials are prepared from highly crystalline polymers and usually exhibit the distinctive rise in resistance associated with PTC compositions a few degrees below the crystalline melting point of the polymer. Accordingly, the $T_s$ of such a composition will be at or near the crystalline melting point of the polymer. Suitable PTC compositions are described in detail in the U.S. patent application of Horsma et al, "Positive Temperature Coefficient of Resistance Compositions", having Ser. No. 601,639, filed Aug. 4, 1975, having the same assignee as the assignee of the present invention, the disclosure of which is incorporated by reference. Preferably, a PTC material used in this invention should exhibit at least about a 6-fold increase in resistance over a temperature increase of 30° C. or less starting at $T_s$. A particularly suited PTC composition found useful in the present invention is a mixture comprising about 50% high density polyethylene, 5% ethylene-propylene rubber and 35% carbon black. This composition has a $T_s$ of about 120° C.

Layers 32a and 32b are also layers of a conductive polymer but have constant wattage (CW) character. A constant wattage material can be defined as one that undergoes less than about a 6-fold increase in resistance over a 25° C. range at least up to about $T_s$ of the PTC layer. Accordingly, a constant wattage layer suitable for use as layers 32a and 32b can be a PTC material having a $T_s$ sufficiently higher than that of layer 31 so that it does not act as the control layer. Constant wattage materials of the type useful in this invention are well known to those skilled in the art. Generally, they comprise a polymer of the type useful as a PTC layer but generally contain relatively high loadings of carbon or other conductive particulate compound.

Layers 32a and 32b, though not essential to the invention, if selected to have a resistance at ambient temperatures higher than that of core layer 31, can provide protection against excessive current inrush into the heater or to control the level of inrush.

An example of a useful constant wattage material is a mixture (by weight) of about 40% carbon black and 60% of an ethylene-vinylacetate copolymer.

Layers 33a and 33b are adhesive layers for adhering metal foil layers 34a and 34b to the heater. The adhesive must be one capable of bonding a metal to an underlying polymer layer and must also be conductive. Useful adhesives, therefore, include carbon filled hot melt adhesives. Specific adhesive formulations may vary according to the nature of the metal layer and the underlying polymer layer. A useful adhesive where the underlying constant wattage layer is the mixture described above and the foil layer is lead comprises 35% carbon black and 65% of an ethylene-acrylic acid copolymer. The selection of a suitable adhesive is well within the level of one skilled in the art.

Layers 34a and 34b are layers of a highly conductive material that can function as electrodes. Suitable materials include highly conductive polymers and metal foil. The choice of metals can vary but it is presently preferred to use lead, lead alloys, copper or aluminum foils. Lead is preferred because of its ductility and resistance to corrosion. The foil layers act as electrodes to laterally distribute the current over the heater. The current then passes through the heater between the electrodes. Elements 35 and 36 are electrical leads which are connected to opposite poles of a battery or an AC outlet, for example by means of the plug socket 37 (see FIG. 1) in the surface of the shell member. The electrode layers can also be provided with a bussing electrode which may be a strip of copper or other suitable metal or a folded-over edge of the underlying foil layer. Any other suitable bussing means can be employed. The electrical leads would be connected through the bussing electrodes to the electrode layers.

The assembly of the aforementioned layers is heated under pressure to soften the polymer layers 31, 32a and 32b to bond them together and to cause the hot melt adhesive of layers 33a and 33b to soften and bond the layers 32a and 32b to electrode layers 34a and 34b. The resulting assembly is then exposed to ionizing radiation in a sufficient dosage to crosslink the polymer layers adequately to give them stability above their melting point yet not so much as to embrittle them. Accordingly, the polymer constituent of each layer should be crosslinkable. If ionizing radiation is used, typically doses of about 5 to about 20 megarads are adequate although in special circumstances more or less may be required for optimum results.

The preform of the heater is next provided with a plurality of slits 57 to facilitate its deformation. The apertures may also be slots or elongated ovals as described in my aforementioned application Ser. No. 638,440 filed Dec. 8, 1975 (now abandoned in favor of Ser. No. 775,882 filed Mar. 9, 1977). However, slits are preferred. Referring to FIG. 6 the plurality of slits 57 are shown. The slits are arranged in parallel rows but each row is offset from the other, i.e., the space between slits in the same row is centered at a point equidistant from the ends of a slit in a row on either side. By this arrangement, when stretched, the heater forms essentially diamond shaped openings. The length, number and spacing of slits can vary according to the degree of expandability desired. The slits can be made by any suitable means.

The heater element is adhesively bound to the resilient layer of the sealing member 17 on the side opposite the mating surface 18. Preferably the adhesive used to bond the heater to the sealing member is one that does not flow but is relatively soft and tacky in the temperature range where deformation of the heat recoverable resilient layer or its subsequent recovery occurs. This is done to allow slippage between the heater and the heat recoverable element during their expansion or contraction. Otherwise, all the expansion and/or recovery of the recoverable member would have to be in the area defined by the diamond openings in the heater element. Suitable adhesives for this purpose include those disclosed in the aforementioned application of Lopez et al, "Hot Melt Adhesive" having Ser. No. 492,722 filed July 29, 1974 (now U.S. Pat. No. 4,018,733).

Figure 8:
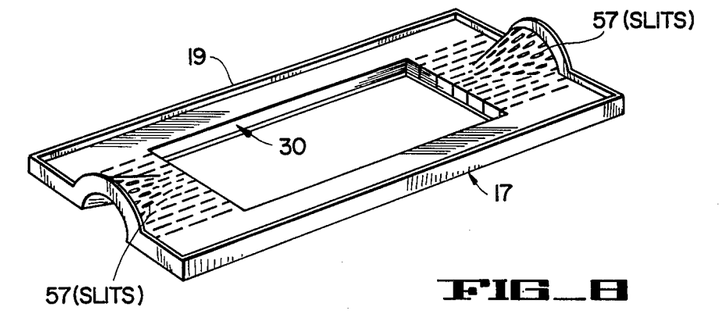
FIG. 8 is a view of the heater of FIG. 6 affixed to the sealing sheet of FIG. 4.

The incorporation of the heater as an element of the sealing member is shown in FIG. 8. The completed sealing member is then bound to shell member 16 and the sealing member is then expanded as previously described. The heater element itself can be used to supply the necessary heat. By virtue of the slits in the heater, little force is required for its expansion and, when the sealing member is rendered heat-recoverable prior to installation of the case, it does not impede recovery of the sealing member.

As can be seen best in FIG. 9, a portion of the sealing member extends beyond ledge 51 and into the cavity formed by the shell halves. Thus, when the case halves are joined and opposing sealing members are securely joined to each other, if the sealing members are flexible enough to be squeezed together by the pressure within the case, the hoop load generated by the pressure can be carried by the rigid shell and "C" shaped closure rather than the sealing member and the bond between the case halves. Accordingly, it is preferred that the polymer employed for the resilient layer be flexible enough for this purpose at the operating temperature of the splice case.

Because of the ability to carry hoop loads as described above, adhesives that have high peel strengths are not required. Therefore, adhesives that function well at low temperature, typically ones that have poor peel strength at higher temperatures, can be employed thereby extending the temperature extremes between which the splice case can usefully be employed. This is a major advantage to the splice case of the present invention.

In the assembly of a splice case having a heat recoverable resilient layer, the heat recoverable member is heated to above its crystalline melting point. When this is done it attempts to recover to the semi-conical configuration of FIG. 3. In so doing it contacts the cables 12 and 13 about their jackets and conforms thereto. The adhesive layer of the sealing member, if employed, will soften also. In so doing, it will act to improve the seal formed between the cable and sealing member 17. Additionally, the adhesive serves to carry tensile and torsional loads on the cable. Such loads are translated into relatively easily carried sheer stresses.

In order to improve the conformance of the sealing member with the substrate it is desirable that the case should include at least one adjustable guide means associated with each sealing member to urge the member into conformance with the substrate. This is particularly desirable to ensure that the same case can be used with cables of different diameters. When the sealing member is heat-recoverable, the guide means must be one which adjusts automatically to urge the sealing member towards the cable while the member recovers, e.g. one or more spring-loaded baffles. For sealing members which are deformed at the time of installation by pressing against the substrate, it is desirable to have one or more arms which can be adjusted, e.g. by a screw mechanism, so that the distance between the posts or between a post and a rigid part of the end section is slightly greater than the diameter of the cable; the posts can if desired be spring-biassed in the desired direction.

One suitable guide means is shown generally by reference numeral 38 in FIG. 9, which is a cross-sectional view of the case of FIG. 1 after installation. The means 38 comprises a support structure 39 mounted in grooves 40 and 41 on either side of the inner surface of shell member 16. The portion of the support extending into the center portion of the shell carries a shaft 42 extending from either side of the support that is mounted in a sleeve bearing or other suitable manner. The shaft is threaded from its ends toward the housing. The pitch of the threads on one side of the housing is reversed from that on the other. Threadably mounted on shaft 42 is a pair of arms 43 and 44. Rotation of the shaft causes the arms to move in or out from the housing according to the direction of rotation. In actual use, the arms function as guide members to position the sealing member 17 about the cables and prevent its lateral displacement by the cable. As a result, more uniform conformance between the sealing member and the cables can be achieved.

Figure 10:
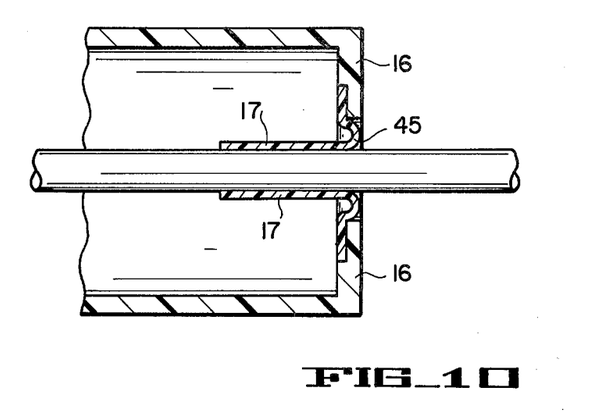
FIG. 10 is a diagrammatic cross-section through a sealed splice case, showing the configuration of the sealing member.

FIG. 10 is a cross-section view through the end portion of an installed splice case similar to that shown in FIG. 1. In order to show more clearly the configuration of the sealing member, FIG. 10 shows only the cable, the sealing member and the shell members. As can be seen from FIG. 10, there is a portion of sealing member 17 that is unsupported by the shell member 16 as a consequence of the requirement that the case be capable of accommodating splices between cables that may vary in size.

Figure 11:
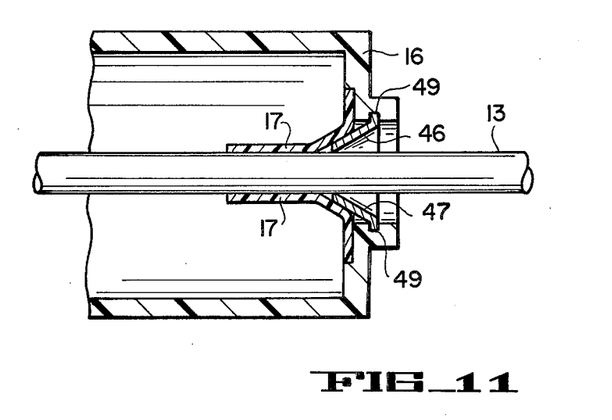
FIG. 11 is a diagrammatic cross-section view through an end portion of the splice case of FIG. 1 after sealing and having the means of FIG. 12 in place.
Figure 12:
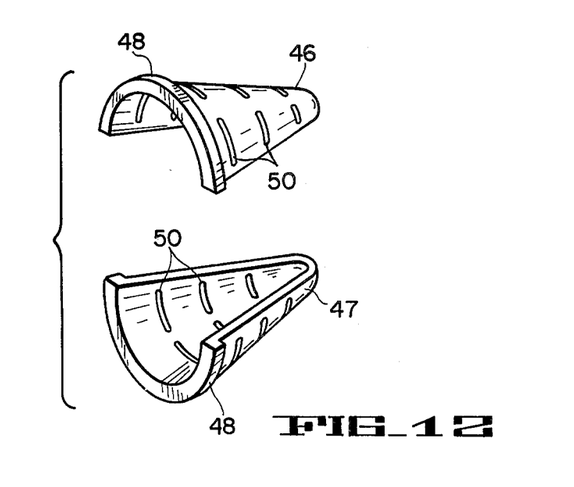
FIG. 12 is a perspective view of means adapted for insertion in the case section of FIG. 1 for preventing aneurisms in the sealing member of the splice case.

If the pressure within the case is high enough, an aneurism 45 may develop in the sealing member in the unsupported area. This can lead to a failure of the sealing member by causing it to rupture thereby opening the case to the environment and requiring a repair. Therefore, desirably, means are provided to avoid this consequence. One such means, suitable for use with a splice case as illustrated in FIG. 1, is illustrated in FIG. 12 which shows a pair of semi-conical members 46 and 47, while FIG. 11 shows the means in position in the installed splice case of FIG. 1. Like FIG. 10, FIG. 11 shows only the cable, the sealing member, the shell members and the semi-conical members 46 and 47.

The members 46 and 47 are provided with a ridge 48 at the large end adapted to be received into groove 49 formed in the end opendings 22 and 23 of the case. They are preferably fabricated of a tough plastic or environmentally stable metal. Preferably, the members are provided with weakened portions 50 to facilitate their being cut or smoothly broken to the desired size. Weakened portions 50 can be slots or areas where the wall thickness is diminished. Before insertion into groove 49, each member 46 and 47 is broken or cut at a weakened portion so that when the two members are joined its smaller diameter is the smallest that will accommodate the cable inserted into that end of the case. When positioned in the splice case, the members act as barriers against the formation of aneurisms in the sealing member at the openings to the case.

Referring now to FIG. 1, the method of enclosing a splice will be described. After the splice 11 is made, the case halves 14 and 15 are positioned about the splice and cables 12 and 13. In the case of heat-recoverable sealing members, the two case halves are mated together, and locking members 29 are inserted in the channels 28. A source of electrical power, for example, a 12 or 24 volt battery or an AC outlet, is then plugged into socket 37 to power heater 30. When the heat output of the heater causes the temperature of the sealing member to exceed the crystalline melting point of the heat recoverable portions of the sealing member, they shrink into close contact with the cables. In the case of sealing members which are deformed by being pressed against the cables, the case halves are connected to a source of electrical power until the sealing members reach a temperature at which they can be easily deformed, and they are then mated together (simultaneously deforming the sealing members) and the locking members 29 are inserted in the channels 28.

During installation, the electrical heating should be such that the temperature of the adhesive layer of the sealing members of each case half is raised to at least the softening point of the adhesive layer, thus forming a substantially airtight bond between the halves and aiding in the formation of an airtight seal about the cables. Use of a self-regulating heater prevents the temperature from rising so high as to damage the sealing member, or for that matter, the splice and the cables themselves.

After a suitable time, the power source is removed and the splice case installation is complete. To reenter the case for any purpose, the power source be reconnected and the heater will again cause the adhesive to soften. The locking members are then removed and the case halves pried apart to expose the splice. To reinstall the case, for example, after repairs to the splice have been made, the steps of installation given above, for sealing members which are deformed by pressing against the cables, are repeated.

The splice case of this invention has been described for use with pressurized telephone cables. It will be appreciated by those skilled in the art that it can be used to enclose joints between cable or conduit of other types. The description of the invention has been directed to presently preferred embodiments. It will be apparent that modifications can be made without departing from the scope of the invention as defined in the appended claims.

I claim:

1. A case for enclosing a short length of at least one elongate substrate in a sealed hollow enclosure, the case having end portions comprising deformable sealing members for sealing around the substrate and a center portion for forming said hollow enclosure which case comprises:

(a) at least one wrap-around body section which can be placed in an assembled position in which the contiguous surfaces thereof can be joined to each other along at least one junction which extends longitudinally of the case;

(b) a plurality of end sections, each of which comprises a transversely-extending deformable sealing member which is deformable at or above ambient temperature and in the assembled position is deformed into a configuration in which there is a seal between the sealing member and the substrate and in which an increase in the pressure within the hollow space increases the forces maintaining the sealing member in contact with the substrate, the surface of the sealing member which contacts the substrate being composed of a material which is flowable at a temperature at which the member is deformable; and (c) assembly means for maintaining the body sections and end sections in the assembled position.

2. A case according to claim 1 wherein said surface of said sealing member is composed of a coating of a material which is flowable at a temperature at which the member is deformable.

3. A case according to claim 2 wherein said coating is a coating of a hot-melt adhesive.

4. A case according to claim 1 which comprises two mating case sections, each of which comprises a hollow body section and two end sections formed integrally therewith, the sealing members of the opposed end sections being adapted to form between them an aperture of closed cross-section for receiving a substrate.

5. A case according to claim 4 wherein each of the mating case section comprises a peripheral sealing sheet which comprises a said transversely-extending sealing member at each end thereof, and which contacts the other peripheral sealing sheet in the assembled position and is adapted to form therewith a continuous internal seal around the junctions between the two case sections and a substrate enclosed between them.

6. A case according to claim 5 wherein at least one of the sealing sheets carries, on the surface thereof which contacts the other sealing sheet, a coating of a hot-melt adhesive.

7. A case according to claim 6 which comprises heating means for heating the hot-melt adhesive to a temperature at which it adheres.

8. A case according to claim 7 wherein the heating means comprises a layer of a conductive polymer exhibiting PTC behavior and electrodes in the form of layers on either side of the conductive polymer layer.

9. A case according to claim 5 wherein the sealing sheet extends into the hollow space.

10. A case according to claim 1 wherein each of the sealing members is selected from heat-recoverable members and members which are capable of being rendered heat-recoverable.

11. A case according to claim 10 which comprises heating means for heating the sealing members to a temperature at which they are heat-recoverable.

12. A case according to claim 11 wherein the heating means comprises a layer of a conductive polymer exhibiting PTC behavior and electrodes in the form of layers on either side of the conductive polymer layer.

13. A case according to claim 1 wherein each of the sealing members is resiliently deformable at an elevated temperature.

14. A case according to claim 13 which comprises heating means for heating the sealing members to a temperature at which they are resiliently deformable.

15. A case according to claim 14 wherein the heating means comprises a layer of a conductive polymer exhibiting PTC behavior and electrodes in the form of layers on either side of the conductive polymer layer.

16. A case according to claim 14 characterised in that the heating means is deformable and has a plurality of apertures therein which facilitate its deformation.

17. A case according to claim 14 which comprises means for controlling the shape of the deformable sealing members as they deform.

18. A case according to claim 17 wherein said controlling means comprises at least one adjustable guide means associated with each deformable sealing member for urging the sealing member into conformance with a substrate.

19. A case according to claim 1 wherein the assembly means (c) comprises mechanical closure means.

20. A case according to claim 19 wherein the assembly means (c) can be released to allow the body section or sections to be removed from the assembled position.

21. A case according to claim 1 wherein each end section also comprises a second transversely-extending deformable sealing member adapted to be deformed into a configuration in which there is a seal between the sealing member and a substrate and in which an increase in the pressure outside the case increases the forces maintaining the second sealing member in contact with the substrate.

22. A case according to claim 1 wherein the sealing member extends into the hollow space.

23. A case according to claim 1 wherein each of said end sections is formed integrally with a body section.

24. A case according to claim 1 wherein each of said end sections can be placed contiguously with at least one body section in an assembled relationship in which the end and body sections can be sealed to each other.

25. A case for enclosing a short length of at least one elongate substrate in a sealed hollow enclosure, the case having end portions comprising deformable sealing members for sealing around the substrate and a center portion for forming said hollow enclosure, which case comprises:
   (a) at least one wrap-around body section which can be placed in an assembled position in which the contiguous surfaces thereof can be joined to each other along at least one junction which extends longitudinally of the case;
   (b) a plurality of end sections, each of which comprises a transversely-extending deformable sealing member which is deformable at an elevated temperature and which in the assembled position is deformed into a configuration in which there is a seal between the sealing member and the substrate and in which an increase in the pressure within the hollow space increases the force maintaining the sealing member in contact with the substrate, the surface of the sealing member which contacts the substrate being composed of a material which becomes flowable at an elevated temperature at which the member is deformable;
   (c) heating means for heating said deformable sealing members to the temperature at which they become deformable; and
   (d) assembly means for maintaining the body sections and end sections in the assembled position.

26. A case according to claim 25 wherein said surface of said sealing member is composed of a coating of a material which is flowable at a temperature at which the member is deformable.

27. A case according to claim 25 wherein said heating means comprises a layer of a conductive polymer.

28. A case according to claim 27 wherein said heating means further comprises a pair of laminar flexible electrodes which (i) are connected to opposite faces of said layer of conductive polymer; (ii) are substantially coplanar with said layer; and (iii) are adapted to be connected to an external source of power to cause current to pass through said layer.

29. A case according to claim 28 wherein said heating means is deformable and has a plurality of apertures through the thickness thereof to facilitate its deformation.

30. A case according to claim 28 wherein the conductive polymer layer exhibits a positive temperature coefficient of resistance.

31. A case according to claim 30 wherein the heating means also comprises at least one intermediate layer which is interposed between the conductive polymer layer and an electrode, and which exhibits constant wattage behavior at temperatures below the switching temperature of the conductive polymer layer.

32. A case according to claim 27 wherein each of the sealing members is selected from heat-recoverable members and members which are capable of being rendered heat recoverable.

33. A case according to claim 27 wherein each of the sealing members is resiliently deformable at an elevated temperature.

34. A case according to claim 25 wherein the sealing member extends into the hollow space.

35. A case for enclosing a short length of at least one elongate substrate in a sealed hollow enclosure, the case having end portions comprising deformable sealing members for sealing around the substrate and a center portion for forming said hollow enclosure, which case comprises:
   (a) at least one wrap-around body section which can be placed in an assembled position in which the contiguous surfaces thereof can be joined to each other along at least one junction which extends longitudinally of the case;
   (b) a plurality of end sections, each of which comprises a transversely-extending deformable sealing member which is deformable at or above ambient temperature and in the assembled position is deformed into a configuration in which there is a seal between the sealing member and the substrate and in which an increase in the pressure within the hollow space increases the forces maintaining the sealing member in contact with the substrate, the surface of the sealing member which contacts the substrate being composed of a material which is flowable at a temperature at which the member is deformable;
   (c) assembly means for maintaining the body sections and end sections in the assembled position; and
   (d) controlling means for controlling the shape of the deformable sealing members as they deform.

36. A case according to claim 35 wherein said surface of said sealing member is composed of a coating of a material which is flowable at a temperature at which the member is deformable.

37. A case according to claim 35 wherein said controlling means comprises at least one adjustable guide means associated with each deformable sealing member for urging the sealing member into conformance with the substrate.

38. A case according to claim 37 wherein each of the sealing members is resiliently deformable.

39. A case according to claim 38 wherein the sealing members are resiliently deformable at an elevated temperature and the case also comprises heating means for heating the sealing members to said elevated temperature.

40. A case according to claim 35 wherein said controlling means comprises members which fit around the substrate to provide a truncated conical member which controls the shape of the deformed sealing members.

41. A case according to claim 35 wherein the sealing member extends into the hollow space.

42. A method of enclosing a short length of at least one elongate substrate in a sealed hollow enclosure which comprises positioning about said substrate a case having end portions comprising deformable sealing members for sealing around the substrate and a center portion for forming said hollow enclosure, which case comprises:

(a) at least one wrap-around body section which can be placed in an assembled position in which the contiguous surfaces thereof can be joined to each other along at least one junction which extends longitudinally of the case;

(b) a plurality of end sections, each of which comprises a transversely-extending deformable sealing member which is deformable at or above ambient temperature and in the assembled position is deformed into a configuration in which there is a seal between the sealing member and the substrate and in which an increase in the pressure within the hollow space increases the forces maintaining the sealing member in contact with the substrate, the surface of the sealing member which contacts the substrate being composed of a material which is flowable at a temperature at which the member is deformable;

(c) assembly means for maintaining the body sections and end sections in the assembled position; and causing the sealing members to deform into sealing contact with the substrate and the body and end sections to seal to each other.

* * * * *